June 3, 1924.  
S. S. TUTTLE  
AUTOMOBILE FENDER LIGHT  
Filed Oct. 27, 1922  
1,496,140
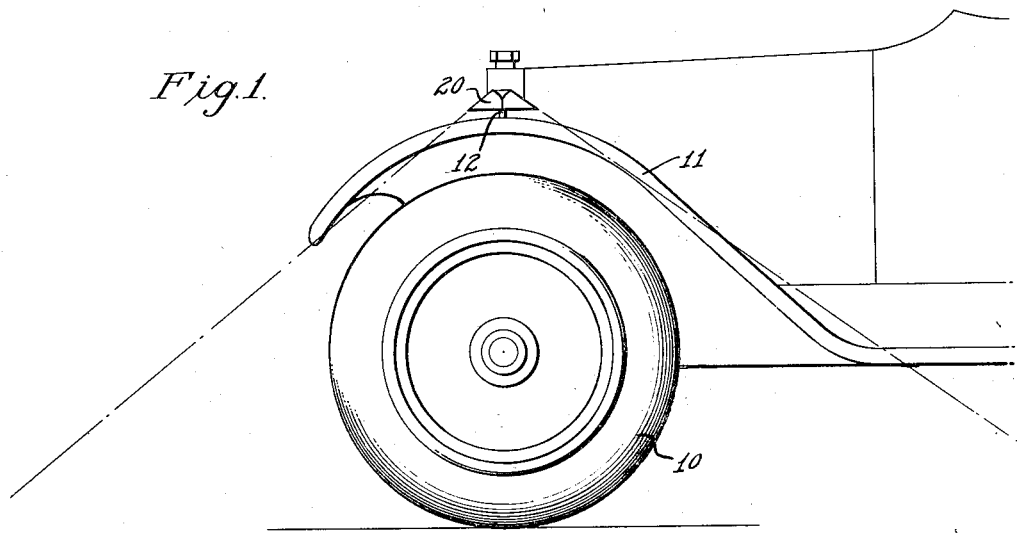
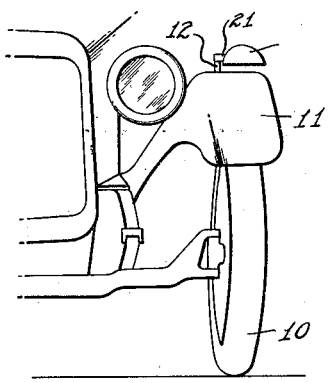
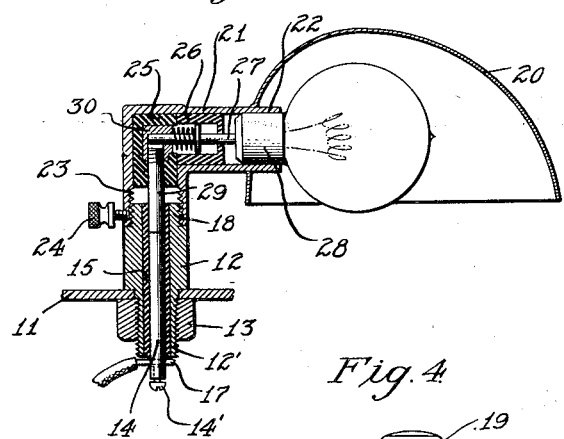
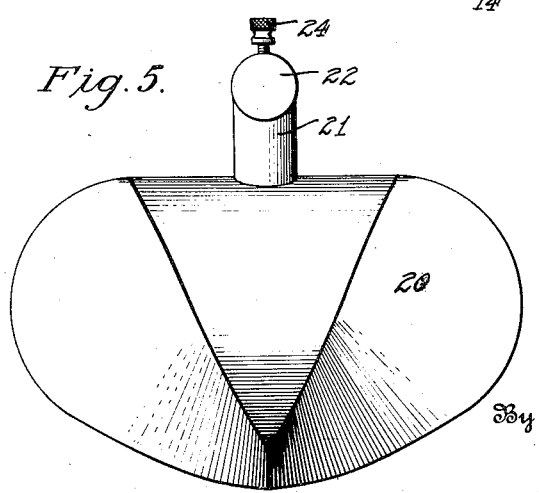
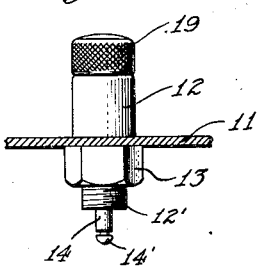
Inventor  
Schuyler S. Tuttle.  
Attorney Patented June 3, 1924.

1,496,140

UNITED STATES PATENT OFFICE.

SCHUYLER S. TUTTLE, OF VAN WERT, OHIO.

AUTOMOBILE FENDER LIGHT.

Application filed October 27, 1922. Serial No. 597,382.

*To all whom it may concern:*

Be it known that I, SCHUYLER S. TUTTLE, a citizen of the United States, residing at Van Wert, in the county of Van Wert and State of Ohio, have invented new and useful Improvements in Automobile Fender Lights, of which the following is a specification.

This invention relates to lamps, and more particularly to lamps of the type which are positioned upon the fender or mud guard of a motor vehicle.

An object of the invention is to provide a lamp which will direct rays somewhat forwardly and to the side of the vehicle for the purpose of clearly illuminating the road to the side of the car.

Another object of the invention is to provide a lamp which will direct rays upon the adjacent wheel in order to render the same visible to the drivers of approaching vehicles, and to facilitate the changing of tires at night.

A still further object is to afford a fender light which has a reflector adapted to direct rays rearwardly along the running board whereby the lamp may serve also as a courtesy light.

The invention also has as an object the provision of an improved mounting for the lamp which will permit the same to be horizontally adjusted, in other words, to be rotated about a vertical axis to permit the light to be used when repairing the motor. The invention seeks to afford a mounting which will permit the lamp and reflector to be quickly removed for use upon any selected mud guard or fender.

In the accompanying drawings there is illustrated one form of a device which the invention may take, and in these drawings:—

Fig. 1 is a side elevational view of the forward portion of a vehicle showing the lamp applied, Fig. 2 is a front elevational view showing a portion of the vehicle, Fig. 3 is a cross sectional view of the lamp and its support, Fig. 4 is an elevational view showing one of the mounts for the lamp with its protecting cap thereon, and Fig. 5 is a top plan.

Referring to the drawings for a detailed description, there is shown therein, conventionally, a motor vehicle having the usual wheels 10 and forward mud guard 11. Upon at least one of the mud guards, and preferably upon all of them, is positioned the lamp mounting which comprises a hollow post 12 provided with a reduced threaded portion 12' projecting through the fender and carrying a lock nut 13. Extending partially through the post is a conductor 14 insulated from the post by means of insulation 15; the upper end of the conductor 14 terminates short of the end of the post and the lower end of the same has an opening through which is passed a wire 17 leading from the battery or any other suitable source of electricity; the wire may be held in the conductor by a binding screw 14' positioned at the end of the conductor and projecting longitudinally thereof into the opening. One of these mounts is preferably positioned upon each fender, and, as shown in Fig. 1, a convenient location is substantially in vertical alignment with the axis of the wheel. The upper end of the post is formed with a reduced threaded portion 18 which may be provided with a protecting cap 19 positioned upon the post when a lamp and reflector are not supported thereby. This cap serves to protect the conductor 14 and to maintain the central opening in the post free from dirt and other foreign matter.

A hood 20 having a reflecting inner surface is adapted to be positioned upon the supporting post or mount when the cap 19 is removed. The reflector and hood are of narrow elongated construction, as shown in Fig. 5 and are relatively shallow so that the rays are directed for a considerable distance longitudinally of the vehicle.

By reference to Fig. 1 it will be noted that the rays are directed forwardly and, as shown in Fig. 2, also to the side of the vehicle. However, the diffusion in a lateral direction is not pronounced, since the rays should preferably be thrown downwardly somewhat sharply so that in repairing a tire the rays are between the workman and the wheel. Additionally, it will be noted that this type of reflector is adapted to throw the rays rearwardly to some extent, as indicated in Fig. 1, whereby the lamp also serves as a courtesy light, since it illuminates the running board.

The hood 20 is open at the bottom and carries an elbow 21 having one open end positioned within the hood and serving as a lamp receiving socket 22. The other open end of the elbow is formed with internal threading 23 adapted to cooperate with the threading upon the end of the post 12. A set screw 24 projects through the elbow and is adapted to lock the lamp and elbow in any set selected position whereby the lamp and hood may be adjusted horizontally about the post as a vertical axis. Upon its interior the elbow carries insulating sleeves 25 and 26. The sleeve 26 carries a contact pin 27 adapted to engage the neck 28 of a lamp and is in electrical circuit with a pin 29 by means of a junction block 30. The pin 29 is adapted to extend into the post 12 into contact with the end of the conductor 14 to complete the circuit.

In daytime the lamp and reflector may be carried within the car, and at night the same will ordinarily be used upon the left forward fender. In this position the adjacent front wheel will be illuminated, thereby clearly placing the same within the vision of drivers of approaching vehicles and illuminating the road to the left side of the car. It will be understood that one of the mount posts, which are small and inconspicuous, will be located upon each fender. In case of tire trouble, or should the light be required on any other fender, it may be quickly detached from the particular fender upon which it is employed and transferred to another fender. A number of these lamps may be used simultaneously, and at times it may be found desirable to employ one lamp upon each front fender and one upon the left rear fender which will serve as a parking lamp.

Obviously numerous modifications may be made in the structure disclosed without departing from the scope of the invention, the same being defined by the following claims.

I claim:

1. The combination with a motor vehicle having wheels and mud guards therefor, of a supporting post mounted upon a mud guard, means for securing the post to the mud guard, a reflector provided with a lamp receiving socket arranged substantially horizontally with its light emitting opening directed downwardly, a sleeve on said reflector having an open end connected to the end of the post, a conductor extending through said post and said sleeve and insulated therefrom, means for securing said sleeve and reflector upon the post, the reflector and lamp socket being laterally offset from and horizontally adjustable about the post as a vertical axis and being normally positioned near the outer edge of the mud guard.

2. The combination with a motor vehicle having wheels and mud guards therefor, of a supporting post mounted upon a mud guard, means for securing said post to the mud guard, a lamp reflector provided with a horizontally disposed lamp receiving socket and arranged horizontally with its light emitting opening directed downwardly, said reflector being transversely elongated to direct rays forwardly and rearwardly of the vehicle and being normally positioned near the outer edge of the mud guard, a sleeve on said reflector having an open end connected to the end of the post, a conductor extending through said post and sleeve and insulated therefrom, and means for securing the sleeve and reflector upon the post, the reflector and socket being laterally offset from and horizontally adjustable about said post as a vertical axis.

3. An automobile sidelight accessory comprising a supporting post, a light projecting device and a cover cap; said post being provided with means for securing the same to an automobile mud guard, a conductor extending through the post and insulated therefrom; the light projecting device comprising a reflector with a lamp receiving socket thereon, a sleeve on said reflector having an open end adapted to be detachably connected to the end of said post with the reflector and lamp socket laterally offset from and horizontally adjustable about said post as a vertical axis, and a conductor extending through said sleeve to engage said post conductor; the cap being provided with means for detachably securing the same upon said post when the reflector and sleeve are removed.

In testimony whereof I have hereunto set my hand.

SCHUYLER S. TUTTLE.